Oct. 14, 1969  EIJIRO TOMIYAMA  3,471,963
TOY AUTOMOBILE AND STARTING DEVICE THEREFOR
Filed May 29, 1967  2 Sheets-Sheet 1

INVENTOR
EIJIRO TOMIYAMA

BY

ATTORNEY

Oct. 14, 1969   EIJIRO TOMIYAMA   3,471,963
TOY AUTOMOBILE AND STARTING DEVICE THEREFOR
Filed May 29, 1967   2 Sheets-Sheet 2

INVENTOR
EIJIRO TOMIYAMA

BY

ATTORNEY

United States Patent Office 3,471,963
Patented Oct. 14, 1969

3,471,963
TOY AUTOMOBILE AND STARTING DEVICE THEREFOR
Eijiro Tomiyama, Tokyo, Japan, assignor to F. E. White Company, Inc., New York, N.Y., a corporation of New York
Filed May 29, 1967, Ser. No. 641,973
Int. Cl. A63h 29/00
U.S. Cl. 46—243                3 Claims

ABSTRACT OF THE DISCLOSURE

A starting device for friction type toy automobile in which the automobile is placed on a platform in a manner such that its rear wheels are in contact with drive wheels which spin the rear wheels to a speed greater than the drive wheel speed whereupon the automobile is caused to travel down the incline of the platform under its own friction motor power.

---

This invention relates to a device for automatically starting friction motor type toy automobiles.

A friction motor type toy automobile is usually started by the operator rubbing the wheels repeatedly against a plane, such as the floor, until sufficient speed is built up in the wheels. At that point the automobile is released to travel under its own friction motor power. The automobile will run until tahe energy stored in the friction motor is expended.

This invention has as its object the automatic energization of the friction motor, whereby manual repeated rubbing of the wheels against a plane is eliminated.

Briefly, this invention comprises a platform on which the friction motor toy automobile is securely placed while its rear wheels to which the friction motor is connected are caused to turn by drive wheels disposed within opening in the platform and directly under the rear wheels. A battery operated motor is provided for driving the drive wheels upon operation of a switch means which is disposed within an opening in the platform directly under the trunk portion of the automobile. A pin is held within the trunk and is operable by an external elongated rod. The pin upon pushing by the rod causes the switch means to operate thereby operating the battery operated motor and driving the drive wheels. When the rear wheels spin faster than the drive wheels, the rod is removed and the automobile is allowed to travel from the platform under its own friction motor power.

These and other objects and features of this invention will become more evident upon consideration of the following detailed description and drawing, in which.

Figure 1:
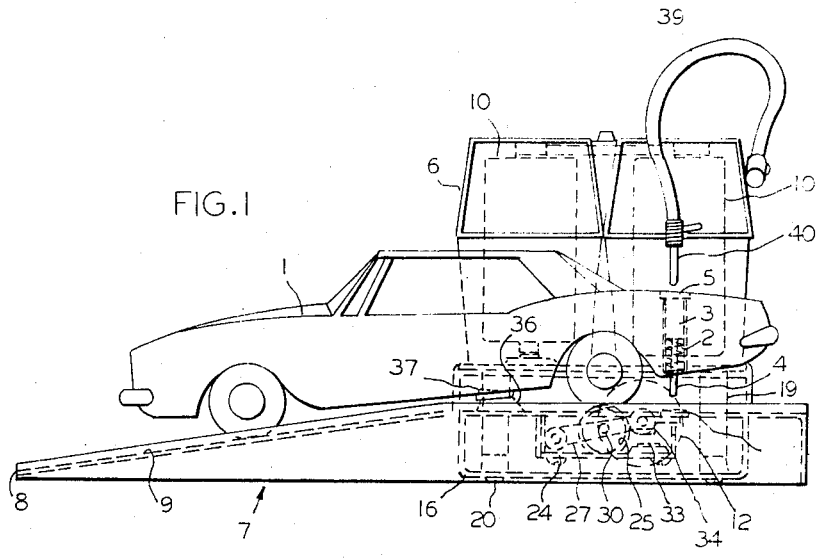
FIG. 1 depicts a pictorial front view of an illustrative embodiment of this invention.
Figure 2:
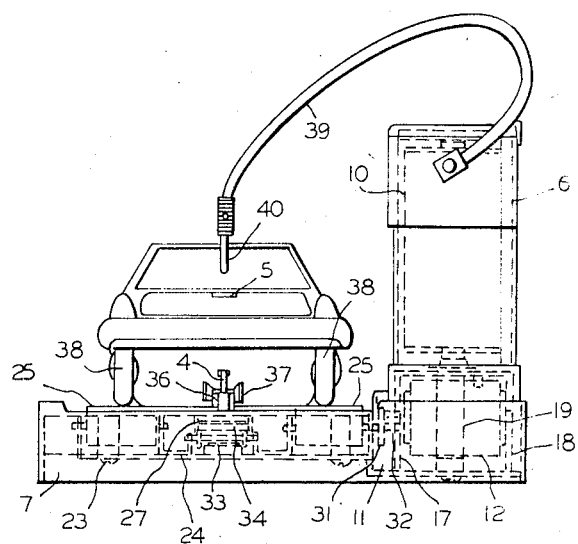
FIG. 2 depicts a pictorial side view of the embodiment of FIG. 1.
Figure 3:
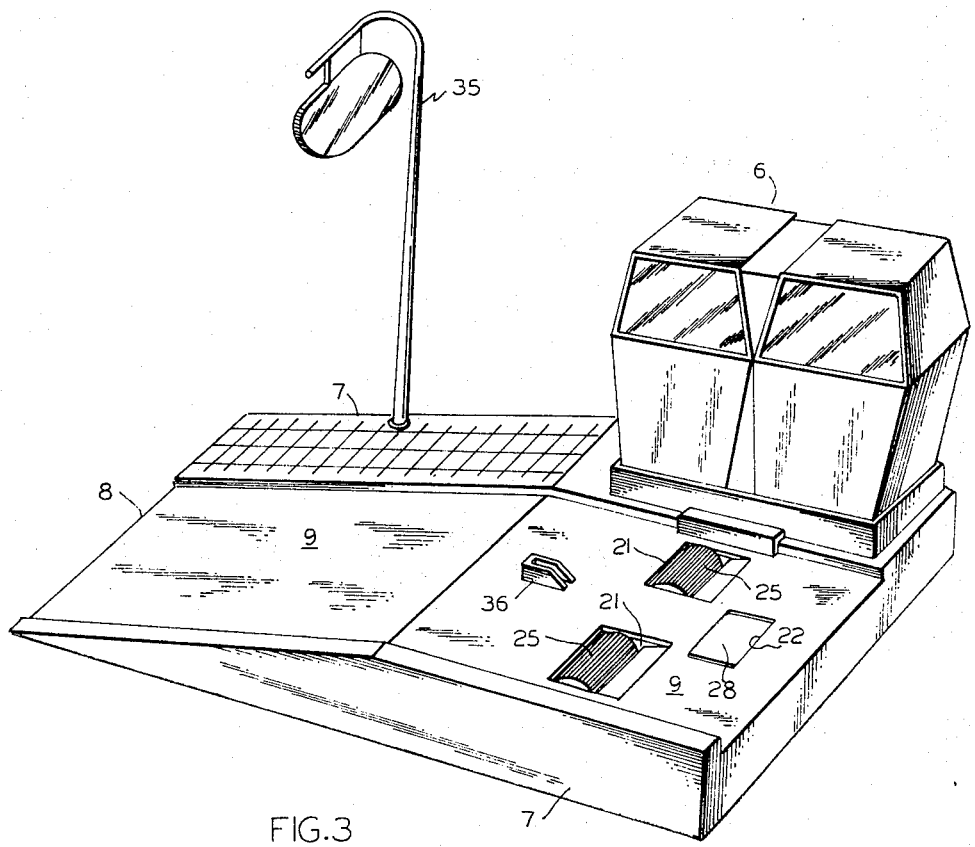
FIG. 3 depicts a perspective of the embodiment of FIG. 1.

Referring to the drawing, in FIGS. 1, 2 and 3 there is depicted a frame 7, having a platform 9, having a level portion and an inclined portion ending at end 8. The level portion has opening 21 into which is disposed driving wheels or cylinders 25, and opening 22 into which is disposed a pushbutton 28. Adjacent the platform 9, a sign 35 (see FIG. 3) for decorative purposes, may be attached to frame 7. Also adjacent the platform 9 is disposed a pair of gasoline pumps 6, into which are placed batteries 10. Also on the level portion there is attached a guide stop 36. Attached to the pump structure is a hose 39 having a hose attachment 40 in the shape of a rod. The purpose of this rod will become apparent in the below discussion. The sign 35, and pump 6, and hose 39 are not essential to the operation of the invention, but are used to improve the appearance of the toy.

A toy friction motor type toy automobile 1 may be placed on the level and inclined portions of the platform 9 in the manner depicted in FIG. 1, having rear wheels 38 which are connected to a friction motor which is not shown, in contact with drive wheels 25. Guide mechanism 37 is attached to the bottom of the automobile 1 to securely hold the rear wheels against the contacting drive wheels 25, when it is placed against guide stop 36. In the trunk of the automobile 1 a pin 3 having projection 4 is held normally within the trunk by spring 2. The rod-like hose attachment 40 may be placed within the hole 5 located at the top of the trunk, and pushed down against the pressure exerted by spring 2, to cause pin projection 4 to push down on pushbutton 28 for purposes to be explained shortly.

Figure 4:
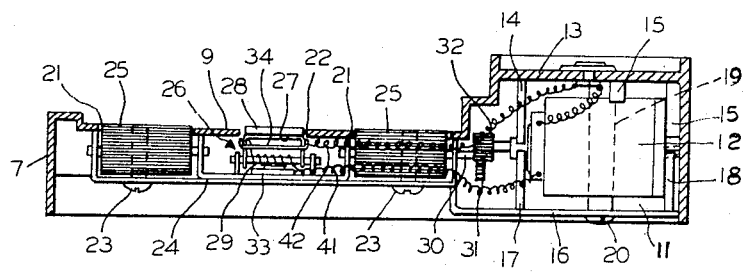
FIG. 4 depicts a pictorial section of the drive mechanism of this invention.

It may be helpful to first explain the drive mechanism depicted in FIG. 4. Directly under the pump structure, a compartment 11 is formed by cover 16 and platform part 13. The cover is held together by support 19 and screw 20. Within compartment 11, a motor 12 is positioned by supports 14 and 15 which project from platform part 13, and supports 17 and 18 which project from cover 16. The motor power is transmitted via drive shaft and pinion 32.

Directly under the platform 9 is a cover 24 held by screws 23. The cover 24 holds the drive wheels 25 in a movable position, by means of supports 21. The right drive wheel 25 is attached by shaft 30 to gear 31, which in turn is connected to pinion 32, to thereby derive drive power from motor 12. The left drive wheel is not shown connected to any drive motor, although such a possibility is possible.

The electric power for driving motor 12 is derived from batteries 10, through wires 41 and 42, when switch 26 is closed. Switch 26 comprises contacts 33 and 34, and lever 27 which is attached to pushbutton 28. The lever is held by spring 29 in such a position that normally contacts 33 and 34 are open.

To store energy in the friction motor of automobile 1, the operator puts the automobile 1 on the platform 9 with its forward portion headed toward end 8 and down the incline. The guide stop 36 and guide mechanism 37 should fit together in the manner depicted. In this manner the automombile rear wheels 38 will be in direct contact with drive wheels 25, and pin projection 4 will be directly above pushbutton 28. With the automobile 1 in the proper position, the operator is ready for the next step.

Next, the operator pushes the hose attachment 40 into the trunk hole 5 to push pin 3 against the spring pressure exerted by spring 2, and cause pin projection 4 to push against pushbutton 28. This causes switch lever 27 to exert pressure against spring 29, and cause contacts 33 and 34 to close. An electrical circuit is closed to connect batteries 10 to motor 12 through wires 41 and 42 as depicted in FIG. 4.

The motor 12 causes right driving wheel 25 to spin in a clockwise direction, as viewed in FIG. 1. Since the rear wheels 38 are in contact with the drive wheels 25, the auto wheels 38 are also caused to spin, but in a counterclockwise direction. The friction motor of the automobile is caused to store energy. Guide stop 36 holds the auto during this winding up step. Also the pin 4 assists in holding the auto, but not to the extent that guide stop 36 does. Another factor in holding the automobile 1 secure during he winding up step, is that the clockwise turning of the drive wheel 25 tends to cause the automobile 1 to travel toward the rear of the platform away from end 8. However, when the speed of rear wheels 38 reaches the speed of drive wheels 25, the automobile 1 will tend to travel toward end 8, down the incline. At this point, plunger or hose attachment 40 is removed from the automobile trunk hole 5. Sufficient speed is generated by the rear wheels, and the automobile 1 is thus caused to travel down the incline of platform 9 under its own friction motor power. The guide stop 36 is shaped to incline toward the rear of the platform 9 such that when the speed of wheels 38 is greater than the speed of drive wheels 25, it will not impede the travel of the auto down the incline.

In some toy automobiles only one rear wheel is used to wind up the friction motor; in that case the drive wheel 25 having the battery operated motor attached thereto should be positioned under that wheel. In most cases where only one rear wheel is used to drive the friction motor, it is the rear right wheel. A slight change of the illustrative embodiment would take care of any other situation.

What is claimed is:

1. In combination, a friction motor type toy automobile having guide means attached thereto, movable pin means and means for holding said pin means normally within said automobile; a platform having an inclined portion and a level portion, said level portion having positioned within an opening defined therein driving wheel means, and pushbutton means; guide stop means attached to said level portion; motor means for operating said driving wheel means; a battery; means for holding said battery; switch means operable by said pushbutton means for connecting said battery to said motor means for the purpose of energizing and operating said motor means; said automobile being positionable on said inclined portion and said level portion of said platform such that the rear wheels of said automobile are in contact with said driving wheel means and said pin means is within vicinity of said pushbutton means; and means for pushing said pin means to operate said switch means to cause said battery to energize and operate said motor means to cause spinning of said driving wheel means whereby said rear wheels are spun to cause storage of energy in said friction motor, removal of said means for pushing from within said automobile after speed of said rear wheels is as great as the speed of said driving wheel means, enabling said automobile to move down said inclined portion of said platform under its own friction motor power.

2. The combination of claim 1, wherein said means for holding comprises a structure simulating a gasoline pump, and said means for pushing comprises an apparatus simulating a hose connected to said pump with a rigid rod attached to the end thereof.

3. The combination according to claim 1, wherein said switch means comprises a lever, a pair of contacts operably by said lever, and spring means for holding said contacts normally open.

References Cited
UNITED STATES PATENTS 2,731,765  1/1956  Carver _____ 46—209 X
2,832,177  4/1958  Mueller _____ 46—244

ROBERT PESHOCK, Primary Examiner

ROBERT F. CUTTING, Assistant Examiner

U.S. Cl. X.R.

46—209